Figure 10:
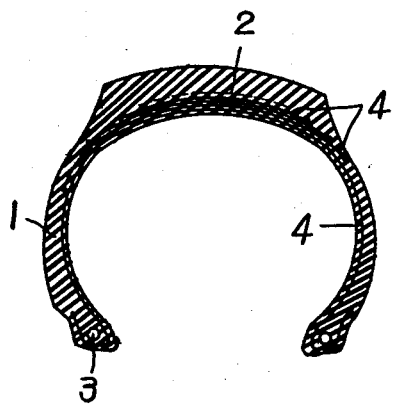

Jan. 5, 1965  HIROSHI UOTANI ETAL  3,164,193
PNEUMATIC TIRES
Filed Sept. 19, 1961  3 Sheets-Sheet 1
Fig-1-
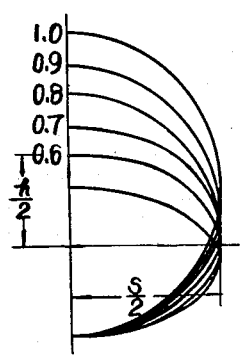
Fig-2-
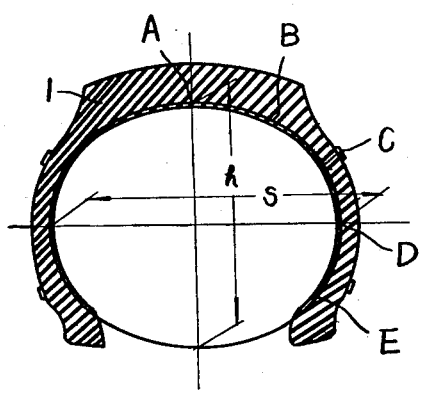
Fig-3-
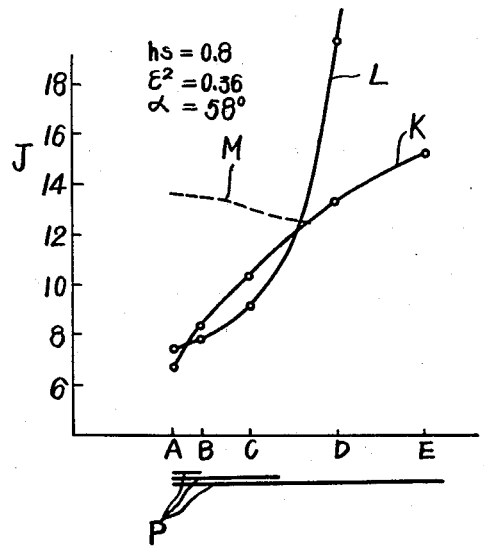
INVENTOR
Hiroshi Uotani
Hiroyasu Iwamoto
BY
Stevens Davis Miller & Mosher
ATTORNEYS

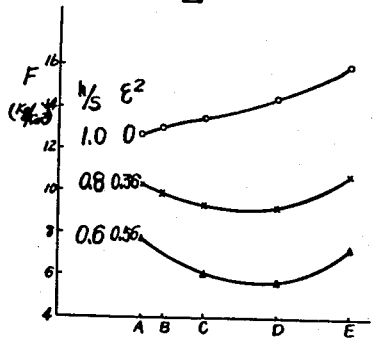
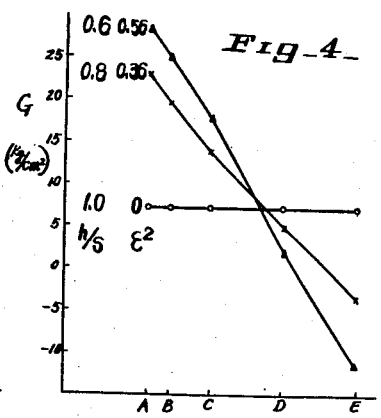
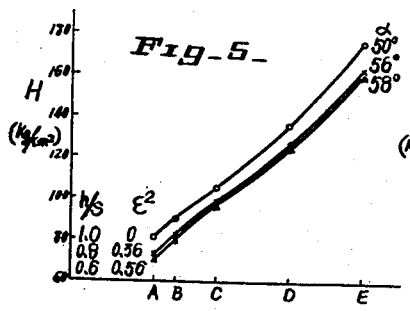
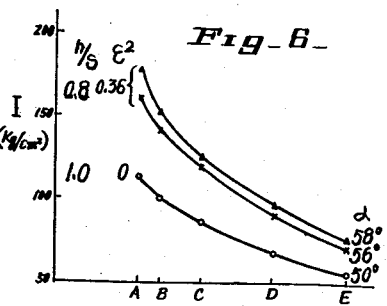
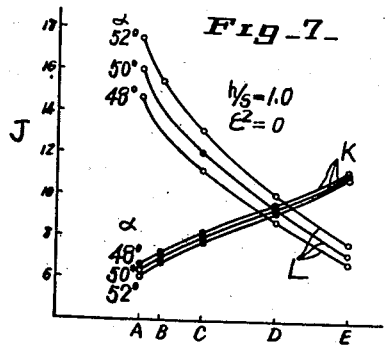
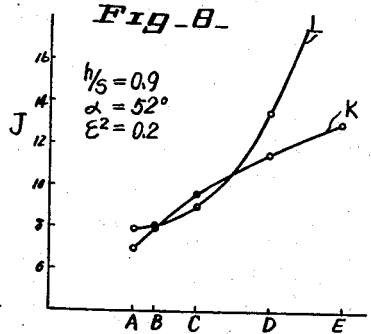

INVENTORS
Hiroshi Uotani
Hiroyasu Iwomoto
BY Stevens, Davis, Miller & Mosher
ATTORNEYS

United States Patent Office 3,164,193
Patented Jan. 5, 1965

3,164,193
PNEUMATIC TIRES
Hiroshi Uotani, Sasayama-machi, and Hiroyasu Iwamoto, both of Kurume, Japan, assignors to Bridgestone Tire Company Limited, Tokyo, Japan, a corporation of Japan
Filed Sept. 19, 1961, Ser. No. 139,304
Claims priority, application Japan Dec. 30, 1960
1 Claim. (Cl. 152—356)

This invention relates to improvements in pneumatic tires, more particularly to the tire case or carcass having the bias cord structure with the reduced number of plies of carcass layers from crown to the side of the tire corresponding to the stresses generated in the carcass layers of low profile tires having the ratio of carcass diameters of 0.95 to 0.6.

The heretofore known tires consist usually of carcass layer, breaker layer and bead portion etc., wherein the carcass layer consists of plied layers of parallel rubber coated cords extending from the bead to bead of the tire and two or more of these parallel carcass layers are so combined that each cord intersects with each other to resist various stresses caused on the carcass by the air pressure created, in case of running, by the external forces. The strength of the carcass layers, thus, depends on the kinds of cord to be used, the cord angle at various parts of the carcass, the numbers of cords and plies.

In addition, the breaker layers are inserted between tread rubber and carcass portion with a breadth substantially extending from shoulder to shoulder of a tire and serve to concentrate the effect due to external shock and other external forces caused on the tread during running; to minimize the effect of the external forces on the carcass layers; and also has partly the effect of reinforcing the carcass layer. The breaker layers are usually manufactured by covering the same cord as in carass ply with rubber and by embedding them in the rubber layers with a coarser pitch than that in the carcass ply. As above described this breaker layer is not intended for directly resisting the air pressure in the tire but its principal object is to protect the carcass from the shock transmitted by the contacting ground surface.

Thus, the air pressure in a tire is mainly sustained by the carcass, while the stresses caused in the carcass portion vary according to the sectional shape of the tire. On the other hand, the carcass layers of conventional tires consist of substantially the same number of plies over the whole tire so that in some cases there are unuseful portions in respect of the strength.

The principal object of the invention is ot obviate such uneffective carcass plies and reduce the weight of tire by reducing the number of plies of the carcass layer which are not useful for strength and to provide tires enabling a comfortable ride and resulting in less heating by reducing the spring constant of the tire.

Figure 11:
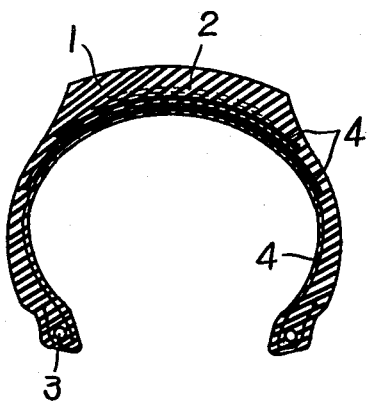
Figure 12:
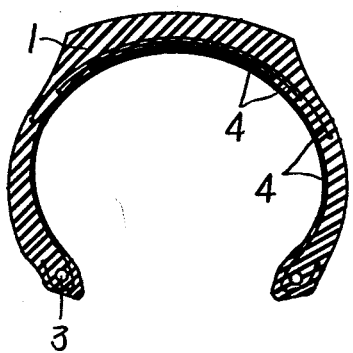
Figure 13:
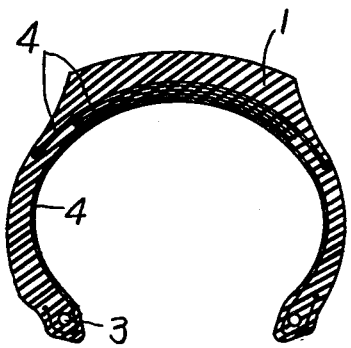

For a better understanding of the invention reference is made to the accompanying drawings, in which FIG. 1 illustrates curve diagrams representing various sectional shapes of a tire carcass assumed to be a circular or elliptical shape;

FIG. 2 is a sectional view of the low profile tire;

FIGS. 3 to 9 represent characteristic curves illustrating stresses in the radial direction, stresses in the circumferential direction, strengths in the radial direction, strengths in the circumferential direction, and the safety factors in the respective positions of different kinds of carcasses respectively; and FIGS. 10 to 13 are schematic sectional views of the tire embodying the invention depicting several manners of carrying out the invention.

It is very difficult to exactly calculate the stresses generated in the carcass by the air pressure in the tire, but the approximate stress distribution can be determined by applying the theory of thin film assuming the shape of carcass as circular or elliptical form.

The stress distribution differs considerably as the shape of the carcass differs. The results of calculation may be shown in FIGS. 3 to 9.

Referring to FIG. 1, the shape of carcass at various sections are shown by circles or ellipses, and in FIG. 2, $h$ represents the height of the carcass when it is assumed to be a circle or an ellipse, $s$ is its width so that $h/s$ is the ratio of carcass diameters, which is shown in these figures the values corresponding to $h/s=1.0, 0.9, 0.8, 0.7$ and $0.6$ respectively.

$$\epsilon^2 = \frac{s^2 - h^2}{s^2}$$

represents square of the centrifugal factor which is shown in these drawings in case of $\epsilon^2=0, 0.2, 0.36, 0.50$ and $0.56$ respectively. A represents the crown center of carcass, B the shoulder, C the decoration line, D the side, and E the position of rim line.

FIG. 3 represents curves of stress distribution of the carcass of 7.00–14 size drawn by taking the carcass positions A, B, C, D and E on abscissa and the radial stresses (stresses in a plane passing through the revolving axis of the tire) on ordinate. From these diagrams it will be apparent that when, as in the conventional tires, the shape of carcass is almost circular form having the diameter ratio $h/s=1.0$ the radial stress F is minimum at the crown center position A and increases gradually towards the side D and rim line position E. On the other hand, if, in a low profile tire, the flatness of the carcass shape increases and the diameter ratio $h/s$ becomes small such as 0.8 or 0.6 and square of the centrifugal factor, $\epsilon^2$, becomes 0.36 or 0.56, the radial stress F usually becomes smaller and also the stress distribution becomes small at a point nearabout the decoration line C and side D. On the other hand, the circumferential stress G is constant when the carcass dia. ratio $h/s=1$ at each position A, B, C, D and E, yet as the flatness increases and the dia. ratio becomes small, the circumferential stress G at the crown center position A increases rapidly while the stress from the side D to rim line position E decreases.

In addition, the strength of the carcass can be calculated from the strength of the cord to be used, the cord angle and the number of the cords so that the strength distribution obtained by calculation for a tire of 7.00–14 size is shown in FIGS. 5 and 6. It is apparent from these figures that the strength in the radial direction H is small at the crown center position A and gradually increases towards side D and rim line position E, and the strength in the circumferential direction I is large at the crown center position A and gradually decreases towards the rim line position E.

The curves of safety factor J calculated from the carcass strength and the above menitoned carcass stresses are shown in FIGS. 7 to 9, wherein K illustrates the curve of safety factor in the radial direction and L that of the circumferential direction. FIG. 7 shows the curves of safety factor for a circular tire when the carcass dia. ratio $h/s=1$ and the difference of the safety factors J is large at the crown part A and rim line part E in both of the radial direction K and circumferential direction L, and it does not result in substantial difference by changing cord angle $\alpha$.

FIGS. 8 and 9 represent safety factors of a low profile tire, wherein FIG. 8 represents those in the radial and circumferential directions respectively when dia. ratio $h/s=0.9$, and the cord angle at the crown center $\alpha=52°$ (the cord angle $\alpha$ is measured by referring to the radial direction), and FIG. 9 shows those when dia. ratio $h/s=0.8$ and $\alpha=58°$.

As apparent from these figures, if the low profile tire is made by the known process wherein the number of plies is determined in conformity with the degree of reinforcement of crown portion, then the shoulder portion and side portion would have more than necessary strength resulting in considerable waste of materials.

In order to obviate such waste according to the invention the number of plies of carcass of a low profile tire having carcass dia. ratio of 0.95 to 0.6 is reduced gradually or step-by-step from the crown center to the side corresponding to the stresses caused in the carcass.

If the distribution of safety factor required for the stresses due to air pressure and other external forces is determined to be a little larger at the crown part as shown by the broken line M in FIG. 9, then the number of plies of the carcass structure having such a safety factor is as shown in the following:

|  | A | B | C | D | E |
|---|---|---|---|---|---|
| No. of Plies | 8<br>4 | 6<br>3 | 5<br>3 | 4<br>2 | 4<br>2 |

As shown in the lower part of FIG. 9, according to the invention the ply P of the carcass can be reduced from the crown part A to the side portion D step-by-step. For instance, a conventional tire having eight plies can be made as a less-ply or reduced ply carcass as 8, 6 and 4 plies by reducing the number of plies step-by-step.

The arrangement of carcass plies according to the invention can be designed in various ways and some embodiments of them are depicted schematically in FIGS. 10 to 13.

Referring to these figures, 1 represents a tire case, 2 a breaker, 3 a bead and 4 carcass plies.

The manner of making step in the carcass ply 4 of the tire embodying the invention may be determined suitably as shown in the drawings. The cord angle and number of cords in the carcass ply may be determined by taking the stresses caused on the carcass along the radial and circumferential directions and the ratio thereof into consideration, the angle being usually 45 to 60°.

According to the invention as above described it is possible to provide substantially required safety factor from the crown to the rim line and also due to the less-ply or reduced ply the spring constant of the tire is reduced so that it provides comfort in drive with less heat generation and in addition a lighter tire than before so that it results in large commercial profits.

*Example*

A tire of 7.00–14 size and dia. ratio of 0.8, having the cord angle at crown center of 56° was manufactured by giving 4 plies from the crown center to the shoulder, 3 plies from the shoulder to the decoration line and 2 plies from the decoration line to bead. As the result of hydraulic test made on the tire it was broken at a portion somewhat below the decoration line by the pressure of 16.5 kg./cm.² so that its safety factor was about 10 times and the spring constant was reduced by 3 to 11% compared with the conventional carcass as shown in the following table:

| Internal Pressure, kg./cm.² | Spring constant, kg./cm.² | | Difference | Percent |
|---|---|---|---|---|
| | Conventional tire | Present Invention | | |
| 2.1 | 25.6 | 22.7 | 2.9 | 11 |
| 1.7 | 20.8 | 19.8 | 1.0 | 5 |
| 1.2 | 17.2 | 16.7 | 0.5 | 3 |

The weight of tire was 9.6 kg. to 11.7 kg. of the conventional tire so that the reduction of weight was about 18%.

What we claim is:

In a pneumatic rubber tire for a vehicle, said tire having a carcass section of flattened profile wherein the carcass height is between 0.95 to 0.6 of the carcass width at the inside surface of said carcass, and wherein said carcass section defines a pair of sidewall portions, a crown portion between said sidewall portions and a side bead in each sidewall portion opposite from said crown, an oppositely biased cord structure in said carcass section comprising a plurality of carcass plies, at least one-half of said carcass plies extending between the opposite side beads of the tire and secured thereto, and the remaining carcass plies being disposed transversely of the tire crown and having a width of progressively smaller dimension in a direction toward the outer surface of said crown, the widest of said remaining carcass plies extending downwardly on opposite sides thereof to a point in the sidewall portion of the tire.

References Cited in the file of this patent
UNITED STATES PATENTS

| 1,165,631 | Seward | Dec. 28, 1915 |
| 1,802,088 | Midgley | Apr. 21, 1931 |
| 2,943,663 | Antonson | July 5, 1960 |

FOREIGN PATENTS

| 1,012,838 | Germany | July 25, 1957 |
| 855,662 | Great Britain | Dec. 7, 1960 |